United States Patent [19]
Oda

[11] Patent Number: 5,830,518
[45] Date of Patent: Nov. 3, 1998

[54] DEVICE FOR TUCKING COVERING MATERIALS

[75] Inventor: Tadayuki Oda, Mie-ken, Japan

[73] Assignee: Nissen Chemitec Corporation, Ehime-ken, Japan

[21] Appl. No.: 290,646

[22] Filed: Aug. 15, 1994

[30] Foreign Application Priority Data

Aug. 16, 1993 [JP] Japan .................................. 5-222786

[51] Int. Cl.$^6$ ...................................................... B28B 3/10
[52] U.S. Cl. ........................ 425/517; 425/520; 425/521; 156/475; 156/476
[58] Field of Search ................................... 425/517, 520, 425/521, 504; 156/212, 214, 475, 476, 477.1, 484, 485

[56] References Cited

U.S. PATENT DOCUMENTS 5,076,880  12/1991  Spengler et al. ........................ 156/382
5,105,488   4/1992  Hutchinson et al. ....................... 5/464

Primary Examiner—David W. Wu
Attorney, Agent, or Firm—Jordan and Hamburg

[57] ABSTRACT

A device for tucking covering materials into a formed component comprises a support mold for the formed component which supports covering materials such as textiles, on its upper face for insertion into the formed component at a ring-formed tucking groove outward from the outer periphery of the upper face. The device has a tucking mold that is positioned at the outer periphery of the support mold for the formed component, and that has a ring-formed tucking blade which is capable of tucking an edge of the covering materials into the tucking groove of the formed component supported by the support mold for the formed component. An outer support mold for an outer periphery is positioned at the outer periphery of the ring-formed tucking mold, and supports the outer periphery of the formed component supported by the support mold for the formed component. The molds are baised respectively by energizing springs so that they protrude upward to be pressed down by a pressing mold, by which a load more than that required to be applied to the tucking blade of the tucking mold is automatically prevented, thus set-up of the dimension of height is simple and arranged with ease, and moreover the covering materials are bonded and fixed effectively onto the formed component with no failure.

10 Claims, 17 Drawing Sheets

DEVICE FOR TUCKING COVERING MATERIALS

BACKGROUND OF THE INVENTION

The invention disclosed herein relates to a device for tucking covering materials which bonds and sticks covering materials such as textiles to a formed component, like door trims for automobiles, and which can tuck, end of an outer periphery of covering materials, such as textiles, into a tucking groove of the formed component.

In the conventional art of devices for tucking covering materials, a thin film bonding device as shown in FIG. 19 was conceived, wherein a thin film S, such as a textile, is bonded to the area surrounded by a groove U of a formed component W provided with the groove U in annular form and the peripheral end of the thin film S is inserted into the groove U. The device for bonding the thin film is characterized in that the upper mold A, having a forming face with a groove and corresponding to the rear face of the formed component W with the groove, is provided so that it may move up and down; and a lower inner mold B, having a forming face corresponding to the surface of the part surrounded by the groove U of the formed component W, is resiliently supported under the upper mold A so that it descends with pressure applied from above. A lower outer mold C having holes and a forming face corresponding to the surface of the outer periphery of the groove U in the said formed component W, is resiliently supported at the outer periphery of the lower inner mold B so that it may move down with pressure applied from above. The said lower outer mold is arranged to protrude upward slightly from the surface of the said lower inner mold B and also arranged with a slight gap between the mold C and the lower inner mold B. An annular inserting blade D, having an upper face contour corresponding to the upper and lower convex and concave part of the groove U, is arranged and fixed between the lower inner mold B and the lower outer mold C, at a position slightly lower than the surface marked when the lower inner mold B goes up.

In such a conventional device for bonding a thin film, the annular inserting blade D has an upper face contour corresponding to the upper and lower convex and concave part of the groove, and is arranged and fixed between the lower inner mold and the lower outer mold C at a position slightly lower than the surface given when the lower inner mold B goes up. Thus when the thin film S is bonded to the formed component W, such deficiencies are noted as the annular inserting blade D not pressing the thin film S into the groove of the formed component W securely, or as the the film S and the formed component W being damaged by being excessively pushed into the groove where the vertical moving amount of the upper mold A, the depth dimension of the groove of the formed component W and the height dimension of the annular inserting blade D are not established accurately, and in addition, disadvantages such as difficult adjusting work and high labor cost are inevitable.

Moreover, further drawbacks are found, such as errors in dimension produced between the annular inserting blade D and the groove of the formed component W, and the annular inserting blade D being damaged even when dust or wrinkle at the end of the thin film are generated.

SUMMARY OF THE INVENTION

In view of such traditional disadvantages as described above, an object of this invention is to provide a device for tucking covering materials, whereby setting up of a vertical moving amount of an upper mold and of the height dimensions of a pair of tucking blades is easy and can be made simply permitting covering materials, such as textiles, to be bonded to the formed component where the end of the outer periphery of the covering materials is pushed into the tucking groove, thus preventing failure of the formed component and the covering materials effectively, and also preventing damage to a pair of tucking blades.

The above and further objects and novel features of the invention will more fully appear from the following detailed description when the same is read in connection with the accompanying drawings.

It is to be expressly understood, however, that the drawings are for the purpose of illustration only and are not intended as a definition of the limits of the invention.

DESCRIPTION OF THE PREFERRED EMBODIMENT

Figure 1:
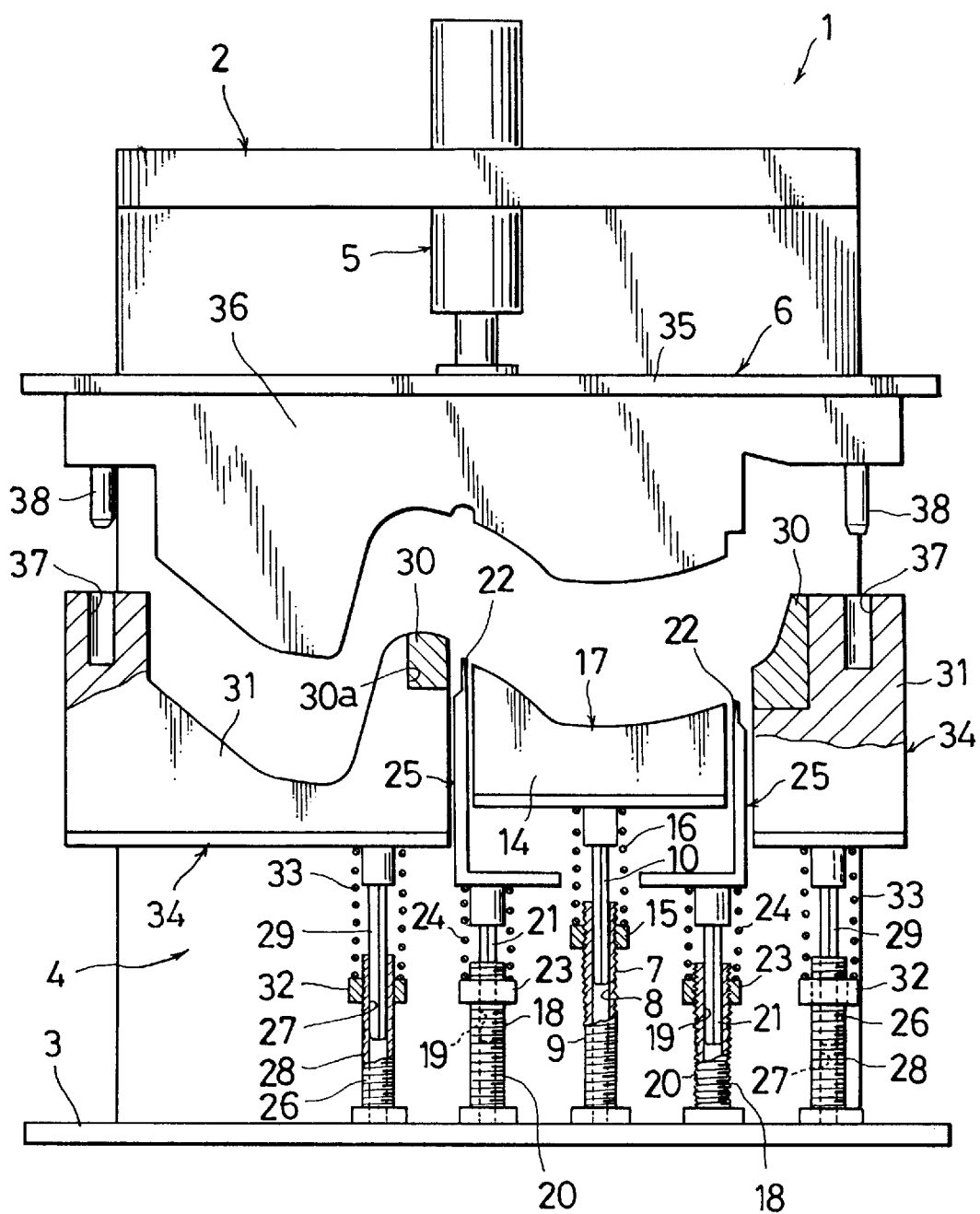
FIG. 1 is a front view, partly in cross-section, showing the first preferred embodiment of the invention.
Figure 2:
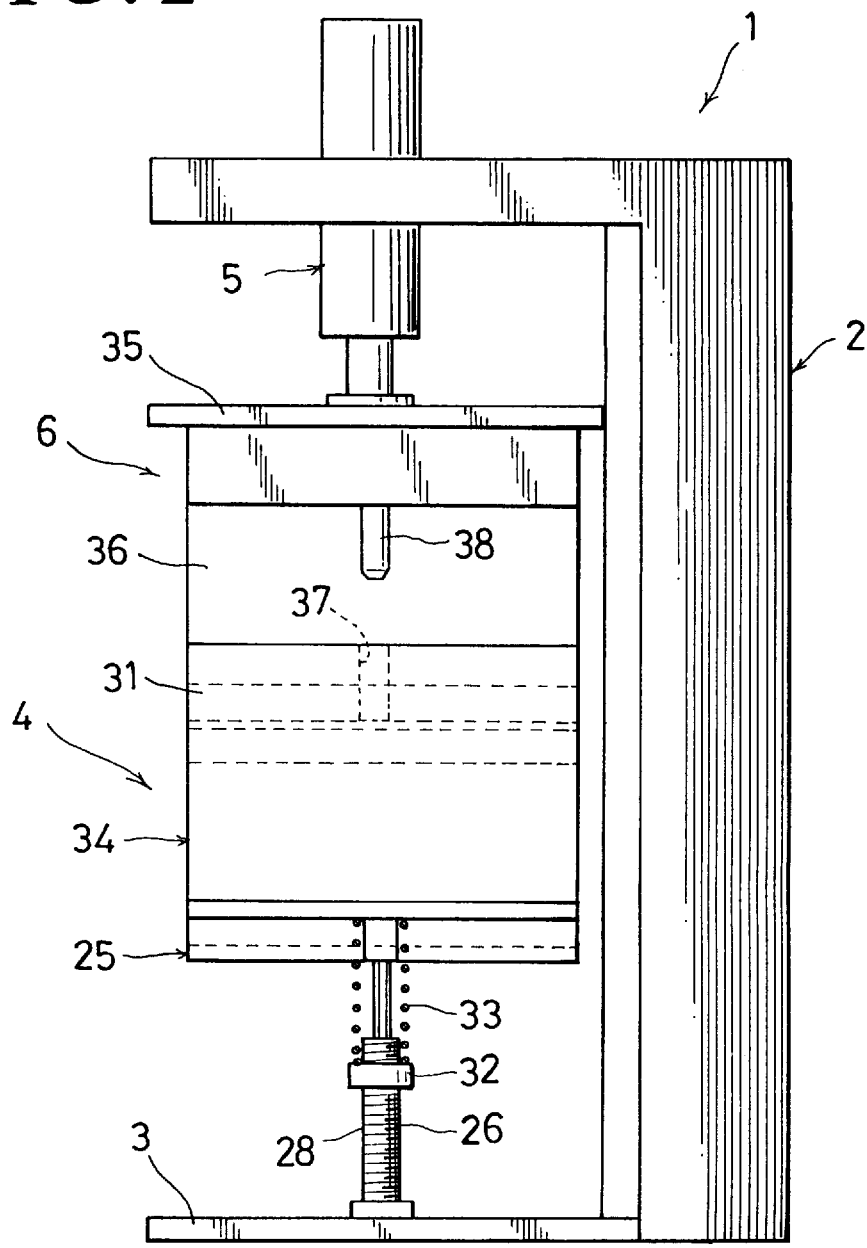
FIG. 2 is a side elevational view showing the first preferred embodiment of the invention.

The invention is explained in detail, as follows, in accordance with the drawings showing preferred embodiments.

Referring to FIG. 1 to FIG. 8 showing the first preferred embodiment of the invention, the number 1 represents a device for tucking covering materials of this invention, wherein the device 1 for tucking covering materials comprises a lower mold 4 mounted on a base plate 3 of a device frame 2, and an upper mold 6 which moves up and down by means of a vertical moving mechanism 5 employing an air cylinder aid hydraulic cylinder on the upper part of the device frame 2, and which is mounted so that it may press the lower mold 4.

Provided oil the lower mold 4 are a support mold 17 for a formed component, mounted on the nearly central pat of the base plate 3 so that it may protrude upward, a tucking mold 25 mounted on the base plate 3 at the outer periphery of the support mold 17 for the formed component and also so it may protrude upward, and a support mold 34 for an outer periphery fitted on the base plate 3 at the outer periphery of the tucking mold 25 capable of upward displacement The support mold 1 7 for the formed component is composed of a support cylinder 9, including a polygonal hole 8 for a shaft and threads 7 on an outer periphery, fixed at the nearly central portion of the base plate 3 a support shaft 10 which is supported in hole 8 of the shaft of the support cylinder 9 in such a manner that it cannot turn in either directions but call move slidably; a support block 14 having a nearly central bottom face fixed on the upper end of the support shaft 10, and which supports covering materials 11, such as textiles, at the upper sides and also supports a formed component 13 having a ring-formed tucking groove 12 at the outer periphery; an threaded adjust ring 15 for adjusting biasing force, which is screwed on the thread 7 of the said support cylinder 9; and a biasing spring 16 which continuously biases upward all the said support block 14 and is placed between the adjusting ring 15 and the support block 14.

The tucking mold 25 comprises at least two or more support cylinders 20, 20, including a polygonal hole 19 for a shaft and threads 18 on the outer periphery thereof, fixed on the base plate 3 to protrude higher than the outer periphery of the support mold 17 for the formed component; support shafts 21, 21 supported in the holes 19, 19 so that they may not turn in either direction but may move slidably; a ring-formed tucking blade 22 having a bottom face fixed to respective upper ends of the support shafts 21, 21, and a tip end that pushes the end of the outer periphery of the coveting materials 11 into the ring-formed tucking groove 12 of the formed component 13 set to be positioned either slightly higher than, at the same height as or lower than the upper face of the outer periphery of the support block 14 for the support mold 17 for the formed component; threaded adjusting rings 23, 23 for adjusting biasing force screwed respectively on the threads 18, 18 of the said support cylinders 20, 20; and biasing springs 24, 24, for continuously biasing upward the ring-formed tucking blade 22, positioned in place between the adjusting rings 23, 23 and the ring-formed tucking blade 22.

The support mold 34 for outer periphery comprises at least two or more support cylinders 28, 28, including a polygonal hole 27 for the shaft and a thread 26 at the outer periphery, and being affixed at the base plate 3 in a ligament with the outer periphery the tucking mold 25 to protrude upward; support shafts 29, 29 supported in holes 27, 27 of the support cylinders 28, 28 so that they may not turn in either direction but may move slidably; an outer support block 31 having a bottom face fixed at respective upper ends of the support shafts 29, 29, to support the outer periphery of the formed component 13; a guide frame 30 mounted detachably on a concave part 30a formed at the inner upper part of the outer support block 31 in correspondence with the tucking blade 22 of the tucking mold 25: adjusting 32, 32 for adjusting biasing force screwed respectively on the threads 26, 26 of the support cylinders 28, 28; and biasing springs 33, 33 for upwardly biasing the said support block 31 interposed between the adjusting rings 32, 32 and the said support block 31

The upper mold 6 is composed of an upper base plate 35 which moves up and down by means of a vertical moving mechanism 5 mounted on the upper pair of the device frame 2; an upper mold body 36 fixed at the bottom face of the upper base plate 35 and formed in a shape similar to the upper contour of the said formed component 13 so that it may press the upper part of the said disposed component 13; and guide pins 38, 38 for positioning formed on the upper mold body 36 to protrude downward for insertion into at least two or more guide holes 37, 37 formed in the outer support block 31 of the support mold 34 for the outer periphery of the lower mold 4.

Figure 3:
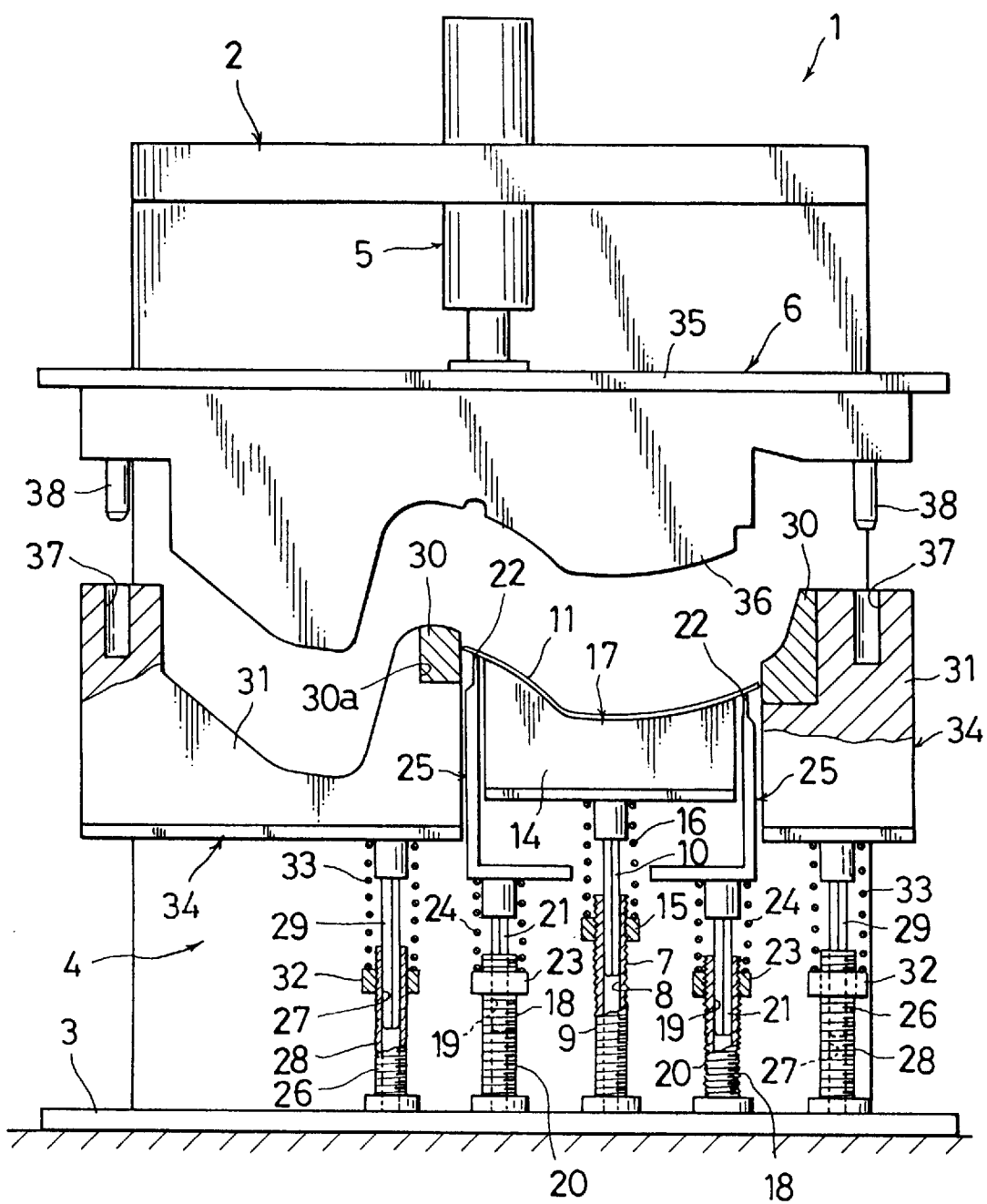
FIG. 3 is a front view, partly in cross-section, showing the state where covering materials are set on the support model for a formed component of the first preferred embodiment of the invention.

The device 1 for tucking covering materials as described above upwardly displaces the upper mold 6 by means of the vertical moving mechanism 5, to position the covering materials 11, such as textiles, on tie support block 14 of the support mold 17 for the formed component with adhesive agent applied, as shown in FIG. 3.

At this time, the outer periphery of the covering materials 11 is positioned to contact the guide frame 30, whereby the edge of the outer periphery of the covering materials 11 is positioned to protrude outward a predetermined distance from the ring-formed tucking blade 22 of the tucking mold 25.

Figure 4:
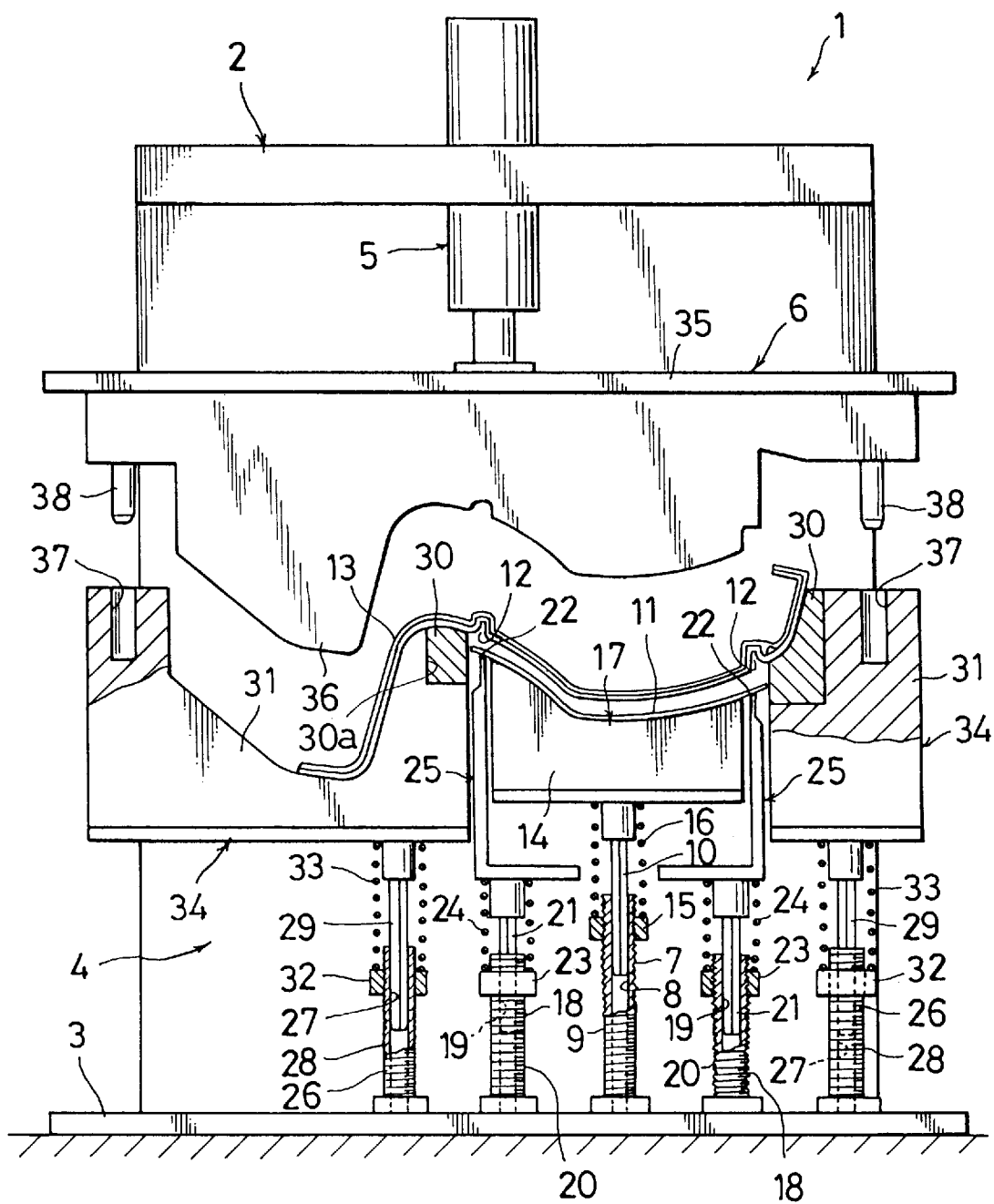
FIG. 4 is a front view, partly in cross-section, showing the state where the formed component is set on the covering materials in FIG.3.

The formed component 13 is supported by the outer support block 31 of the support mold 34 for outer periphery, as illustrated in FIG. 4. In this state, the formed component 13 is supported by the outer support block 31 out of contact with the covering materials 11.

Figure 5:
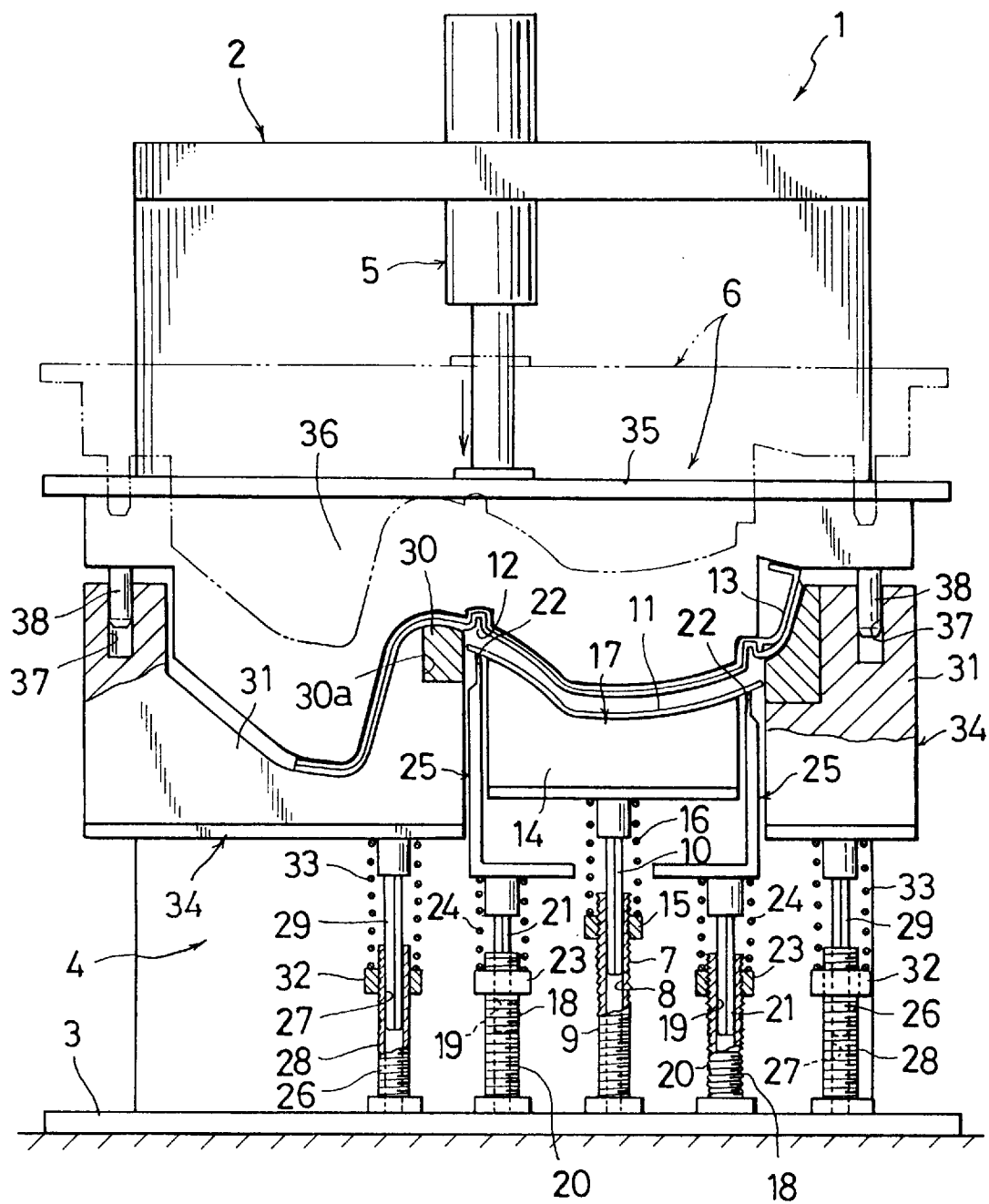
FIG. 5 is a front view, partly in cross-section, showing the state where the pressing mold is brought into contact with the formed component from the state in FIG. 4.
Figure 6:
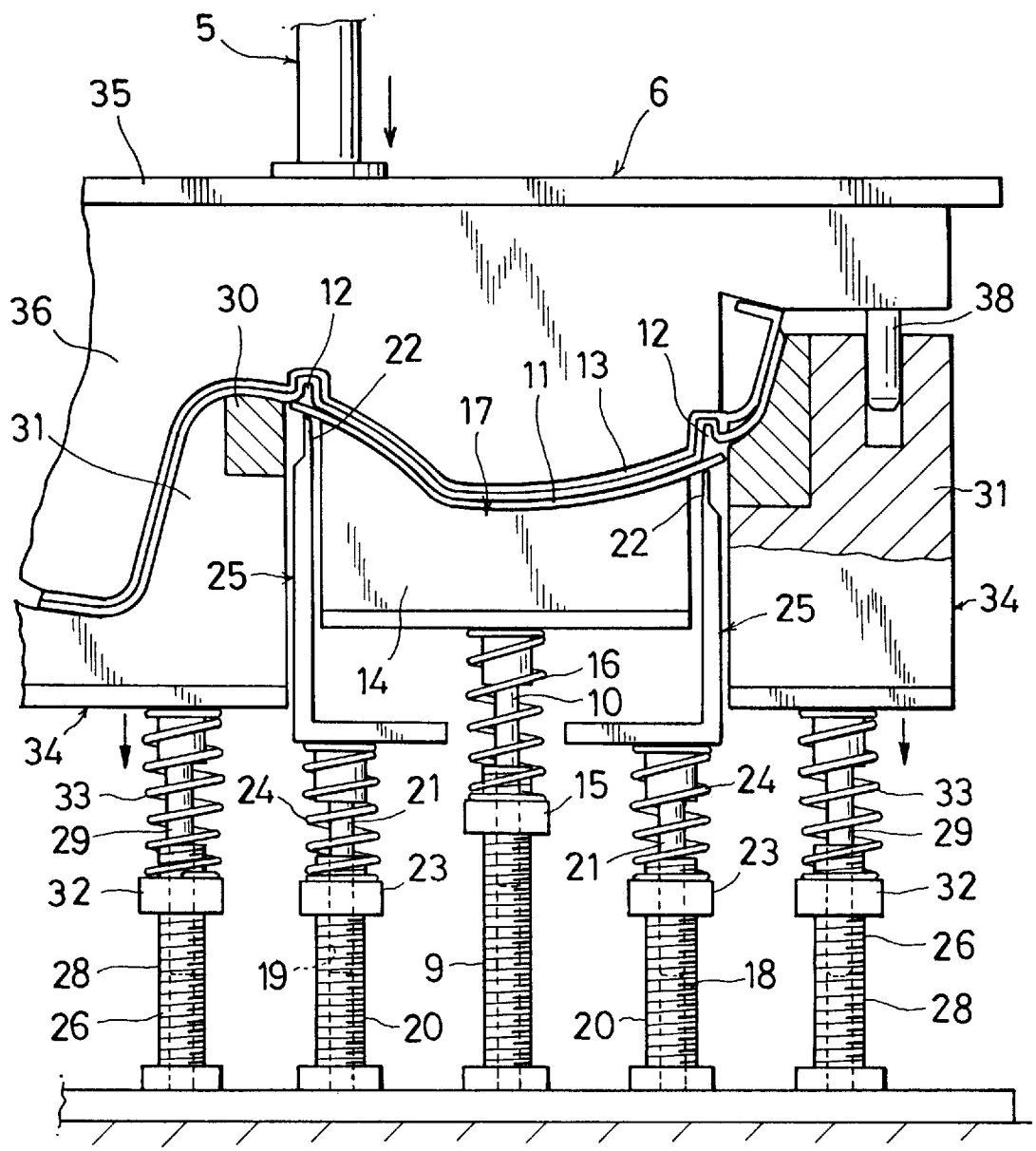
FIG. 6 is all enlarged view of the main part of FIG. 5.

The vertical moving mechanism 5 is then operated to move the upper mold 6 down as shown in FIG. 5, the guide pins 38, 38 are inserted into the guide holes 37, 37 of the outer support block 31 of the support mold 34 for outer periphery, and the upper mold is lowered into position By the downward movement of the outer upper mold 6, the support block 31 of the support mold 34 is pressed down against the force of the biasing springs 33, 33, and the formed component 13 is brought into contact with the covering materials 11 and bonded thereto with an adhesive agent. The support block 14 of the support mold 17 for the formed component is then pressed down against the force of the biasing spring 16, as shown in FIG. 6.

Figure 7:
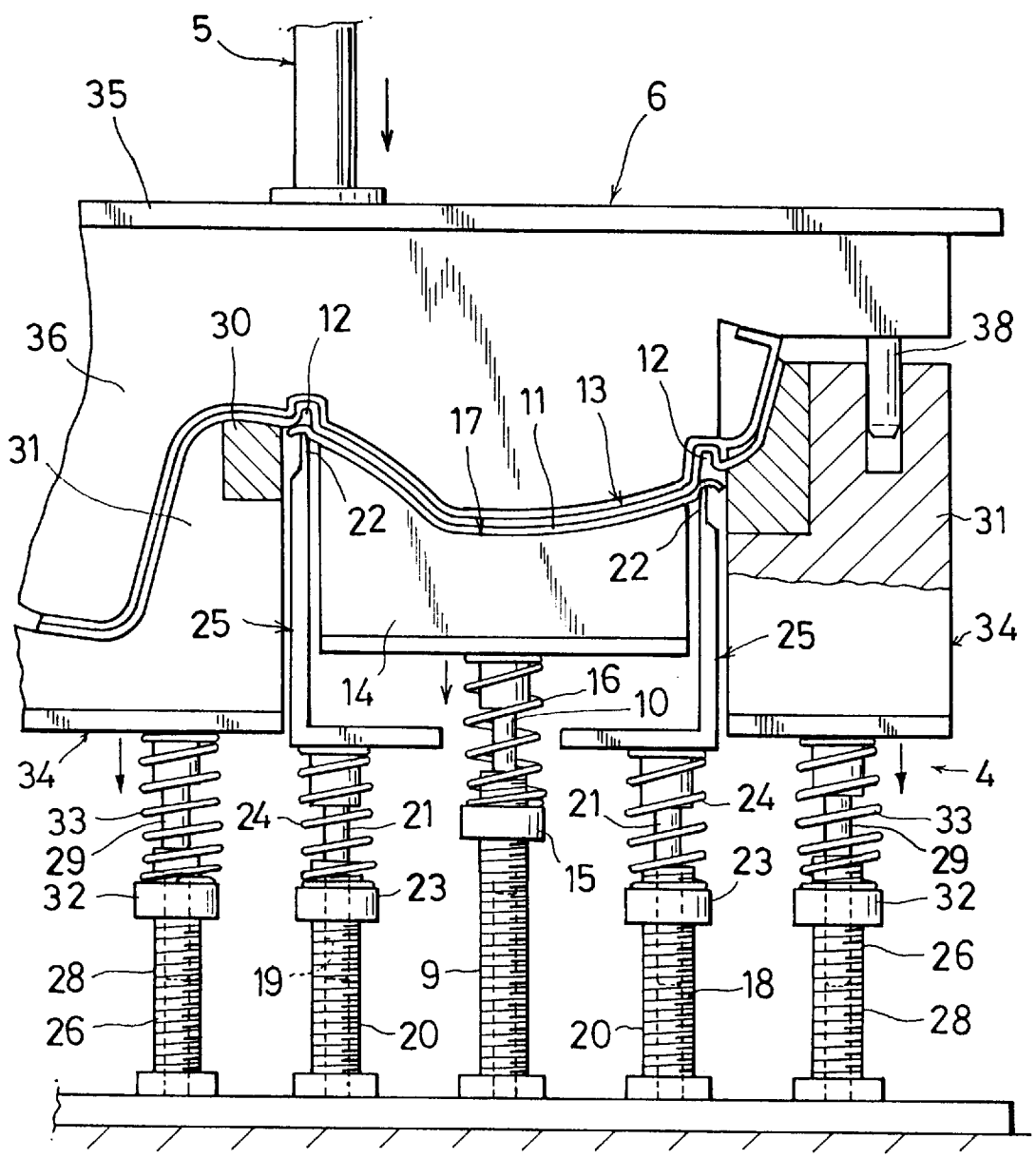
FIG. 7 is an enlarged view of the main part, showing a state where the covering materials are slightly pressed by the tucking blade, while the pressing mold is pushed downward from the state in FIG. 6.
Figure 8:
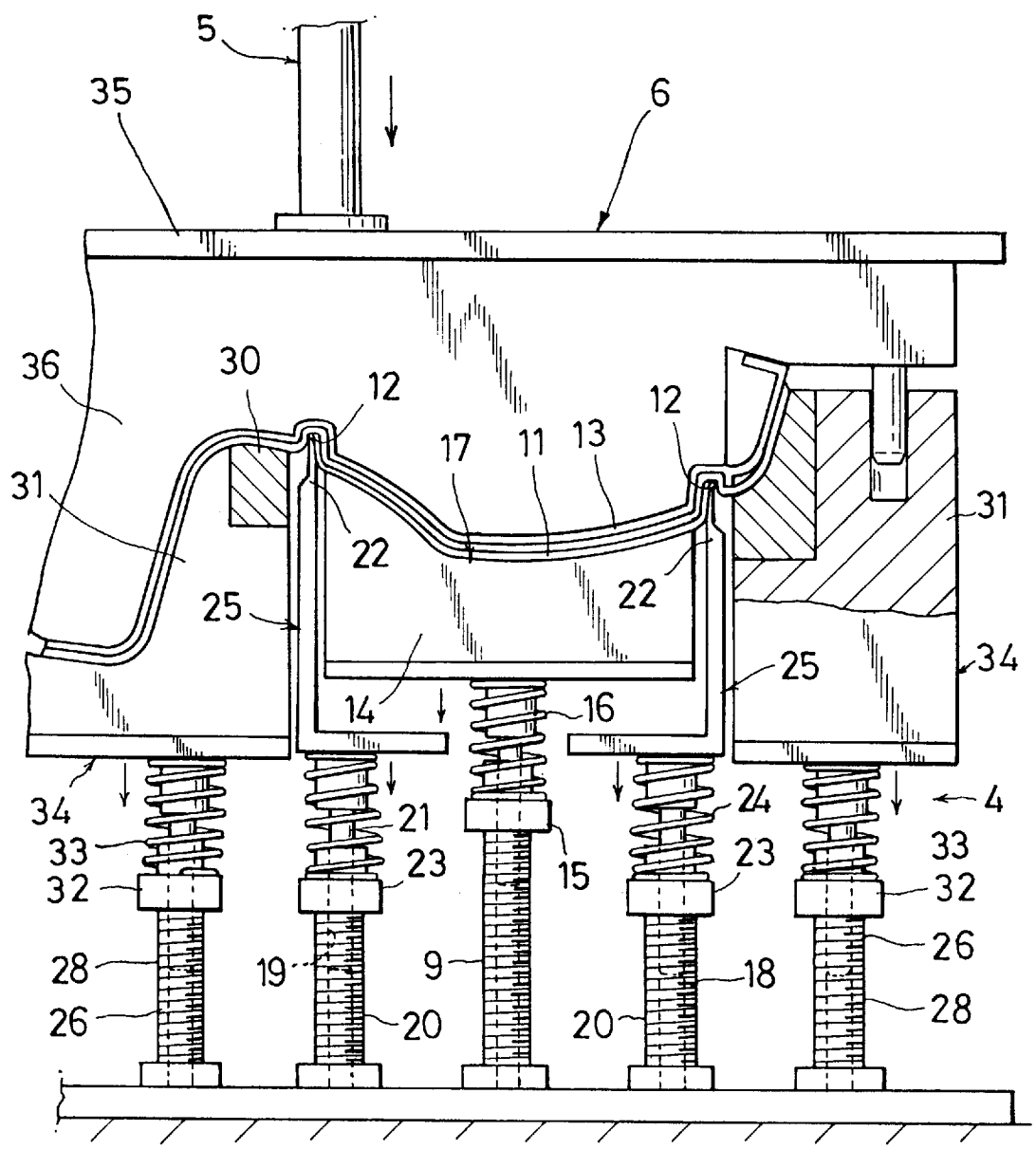
FIG. 8 is an enlarged view of the main part, showing a state where the covering materials are pushed into the tucking groove of the formed component by the tucking blade, while the pressing mold is pushed downward from the state in FIG. 7.
Figure 9:
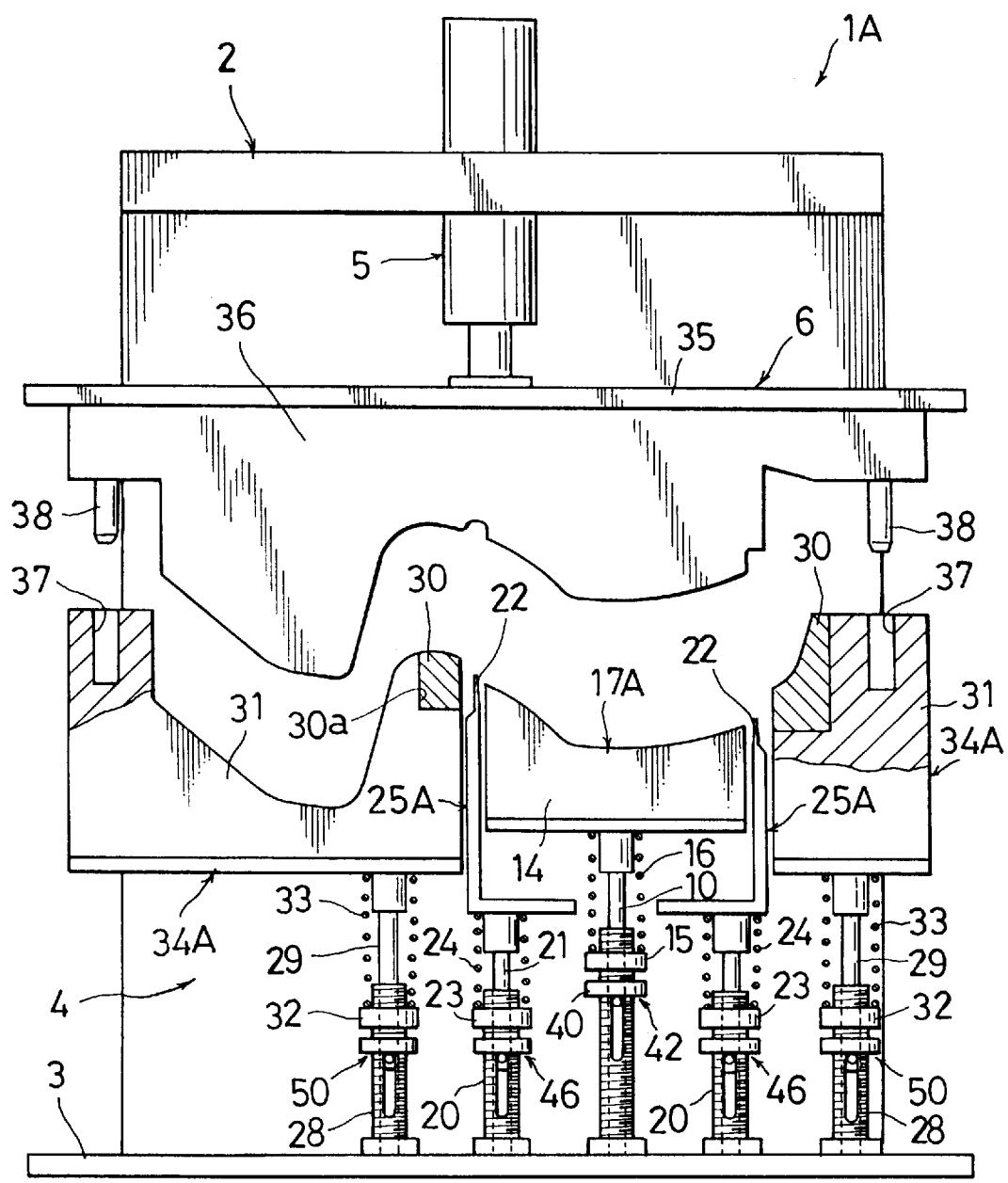
FIG. 9 is a front view, partly in cross section, showing the second preferred embodiment of the invention.

With the support mold 17 for the formed component pressed down, the edge portion of the ring-formed tucking blade 22 of the tucking mold 25 is pressed down against the force of the biasing springs 24, 24, as shown in FIG. 8, and interposed into the ring-formed tucking groove 12 of the formed component 13 to push the edge of the outer periphery of the covering materials 11 as shown in FIG. 7.

In such a state as described above, the covering materials 11 are bonded and affixed to the formed component 13, and the edge of the outer periphery of the covering materials 11 is tucked into the tucking groove 12 and a bonded and fixed state is maintained.

The vertical moving mechanism 5 is then operated to cause the upper mold 6 to ascend, and the formed component 13 with the covering materials tucked therein, which is supported by the support mold 34 for outer periphery, is removed. Such operation as mentioned above is repeated to produce formed components with textile covering materials tucked in.

Referring now to FIG. 9 to FIG. 18, different preferred embodiments of the invention are explained as follows. In the explanation of the different preferred embodiments of the invention, the same numbers represent the same components as in the first preferred embodiment of the invention to omit repetition of explanation.

Figure 11:
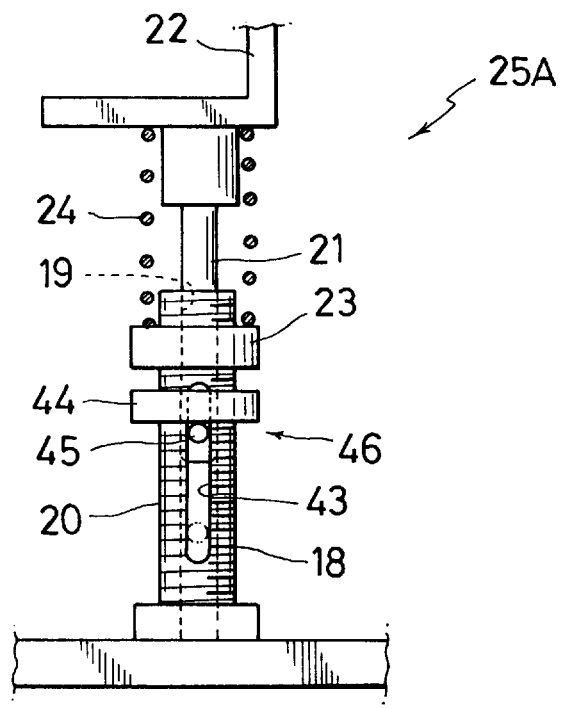
FIG. 11 is an explanatory drawing of the stop-mechanism of the tucking blade for the tucking mold in the second preferred embodiment of the invention.
Figure 12:
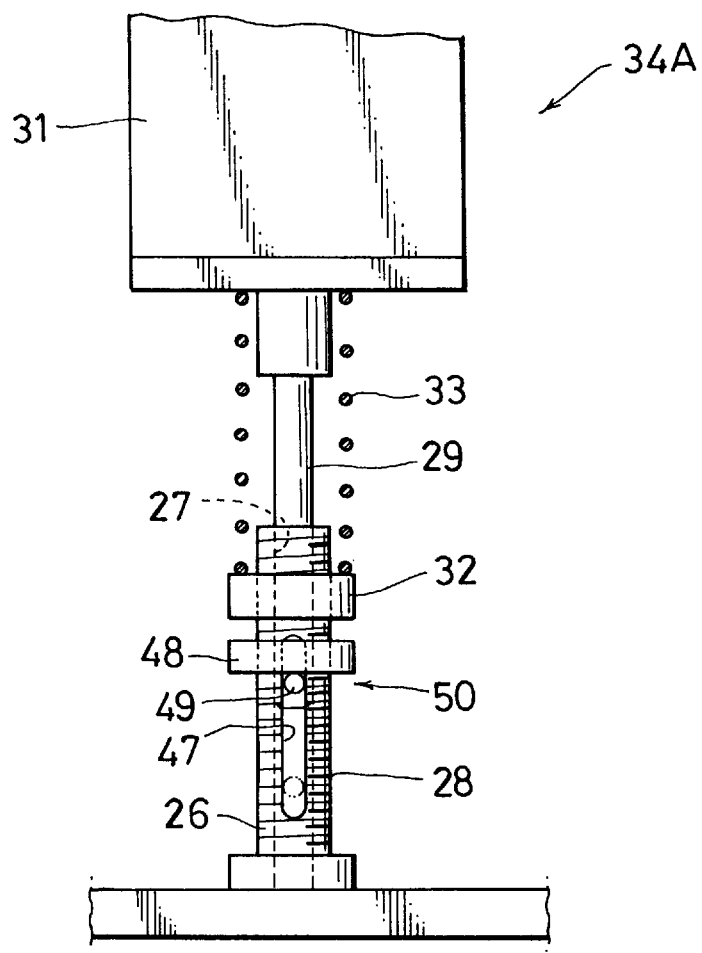
FIG. 12 is all explanatory drawing of the stop-mechanism of the support block of the support mold for the outer periphery in the second preferred embodiment of the invention.
Figure 13:
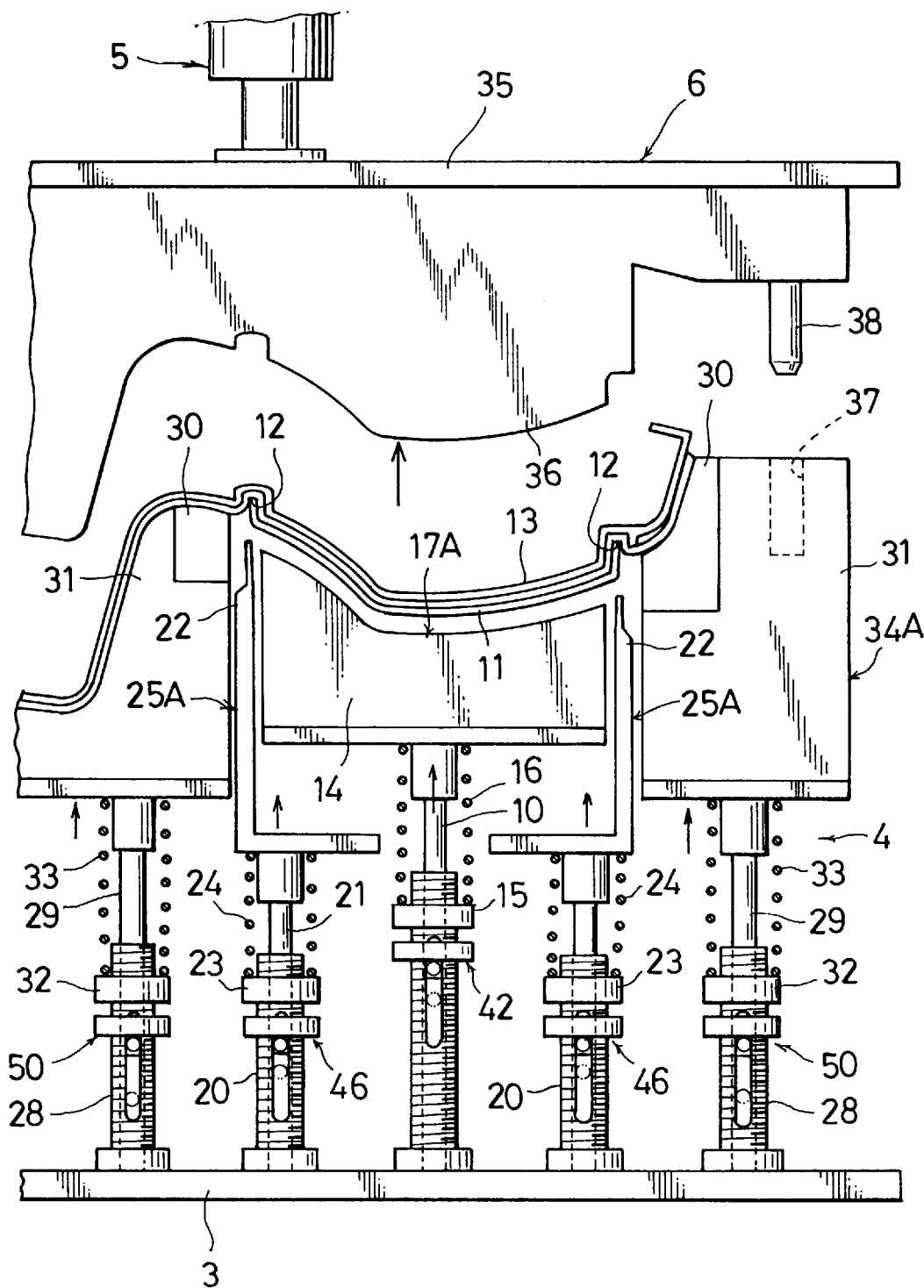
FIG. 13 is an explanatory drawing showing a state after forming in the second preferred embodiment of the invention.

In the second embodiment referred to in FIG. 9 to FIG. 13, the different points from the first preferred embodiment of the invention are that the device is provided with a support block stop-mechanism 42 which is capable of stopping the support block 14 of a support mold 17A for tile formed component at in arbitrary ascending position, a tucking blade stop-mechanism 46, 46 is capable of stopping the ring-formed tucking blade 22 of a tucking mold 25A at an arbitrary ascending position, and a stop-mechanism 50, 50 for the support block for the outer periphery stops the outer support block 31 for a support mold 34A at an arbitrary ascending position. By providing such device 1A for tucking covering materials including the support block stop-mechanism 42, tucking blade stop-mechanism 46, 46, and stop-mechanism 50, 50 for the support block for outer periphery as detailed above, when the upper mold 6 is caused to move up after the lower mold 4 is pressed by the upper mold 6, the ring-formed tucking blade 22 which is pushed into the ring-formed tucking groove 12 of the formed component 13 is removed automatically by the force of the biasing springs 33, 33 which bias the support mold 34A for outer periphery upward, as shown in FIG. 13.

Figure 10:
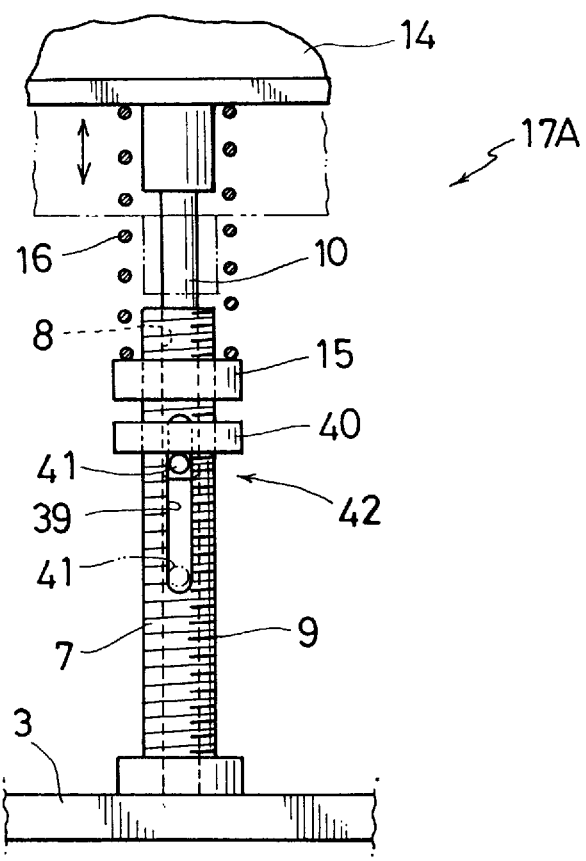
FIG. 10 is an explanatory drawing of the stop-mechanism of the support block of the support mold for the formed component in the second preferred embodiment of the invention.

The support block stop-mechanism 42 comprises all axial cutout out groove 39 formed on the support cylinder 9, a position adjusting ring 40 screwed on the thread 7 of the support cylinder 9, and a stopper pin 41 which is fixed at the support shaft 10 slidably mounted on the support cylinder 9, and which moves slidably within the cut-out groove 39 and stops at the position adjusting ring 40, as shown in FIG. 10.

The tucking blade stop-mechanisms 46, 46 are composed of axial cut-out grooves 43, 43 formed respectively on the support cylinders 20, 20, position adjusting rings 44, 44 screwed respectively on the threads 18, 18 of the said support cylinders 20, 20, and a stopper pins 45 fixed to the support shafts 21, 21 slidably mounted on respective ones of the support cylinders 20, 20. The stopper pins 45 move slidably within the said cut-out grooves 43, 43 and stop at the position adjusting rings 44, 44, as shown in FIG. 11.

The stop-mechanisms 50, 50 for the support block for the outer periphery comprise axial cut-out grooves 47, 47 formed respectively on tile support cylinders 28, 28, position adjusting rings 48, 48 screwed respectively on the threads 26, 26 of the support cylinders 28, 28, and stopper pins 49, 49 fixed respectively to the support shafts 29, 29 slidably mounted respectively on the support cylinders 28, 28 the stopper pins 49, 49 move slidably within the cut-out grooves 47, 47 and stop at the position adjusting rings 48, 48, as shown in FIG. 12.

Figure 14:
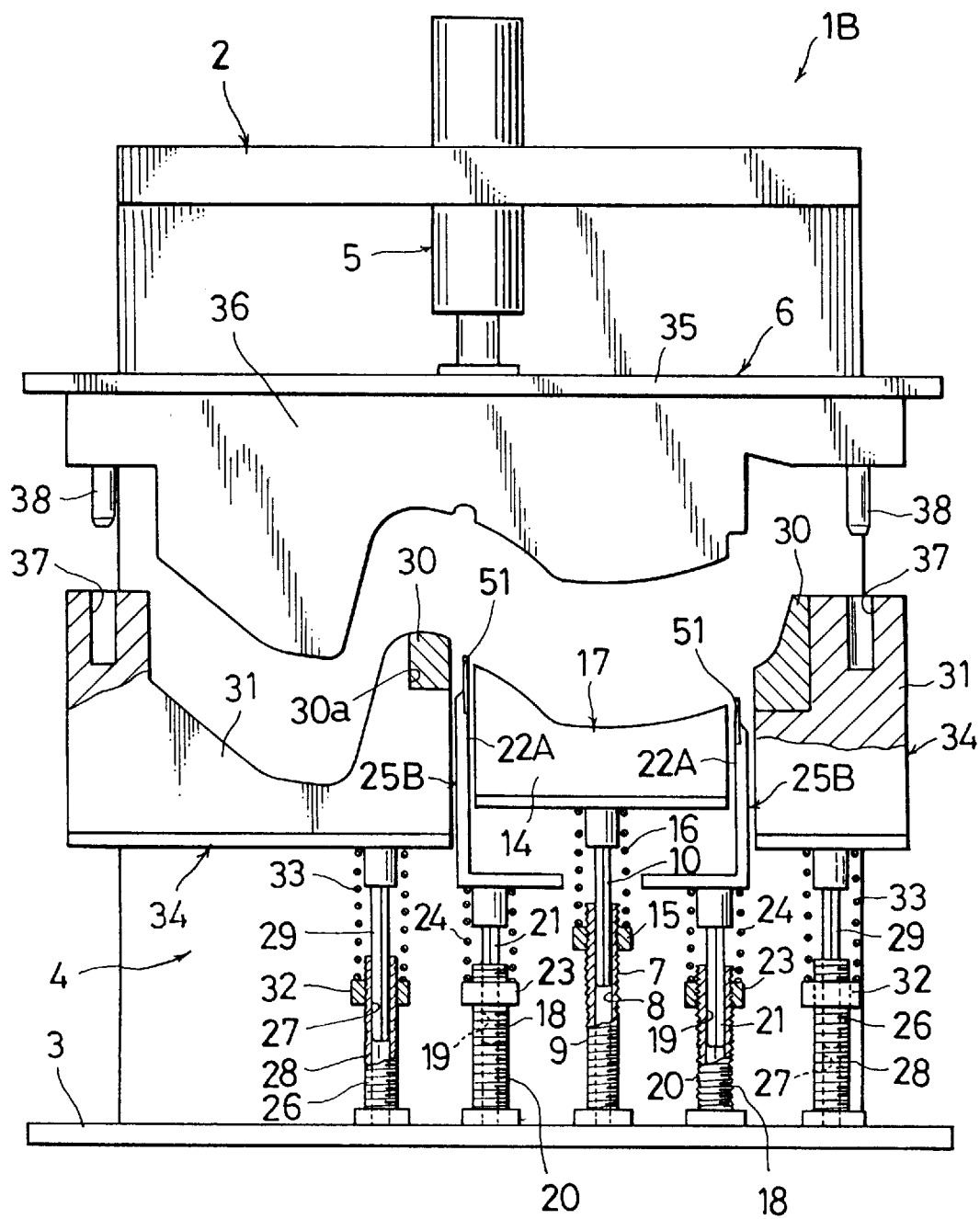
FIG. 14 is a front view, partly in cross section, showing the third preferred embodiment of the invention.
Figure 15:
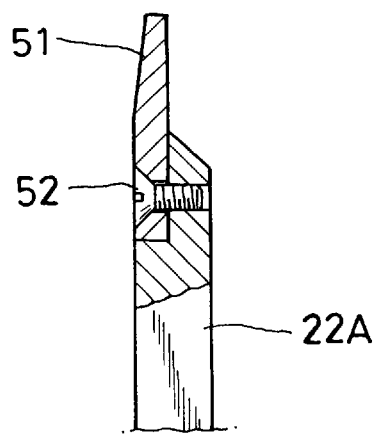
FIG. 15 is a sectional view of the main part of the tucking blade in the third preferred embodiment of the invention.
Figure 16:
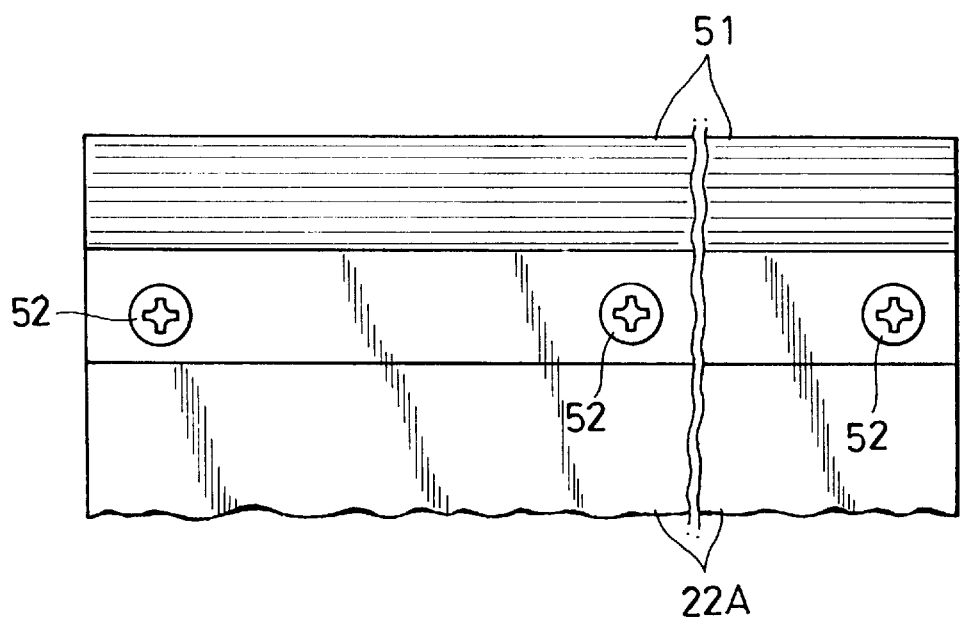
FIG. 16 is a front view, partly in cross section, of the main part of the tucking blade in the third preferred embodiment of the invention.

In the third preferred embodiment of the invention referred to in FIG. 14 to FIG. 16, the major different points from the first preferred embodiment of the invention are its ring-formed tucking blade 22A of the tucking mold 25B, wherein the ring-formed tucking blade 22A is structured in such a manner that the blade portion 51 of the tip is fitted detachably by plural countersunk screws 52. With such a device 1B for tucking covering materials as includes the tucking mold 25B employing the ring-formed tucking blade 22A formed as above, the blade 51 is easily replaceable.

Figure 17:
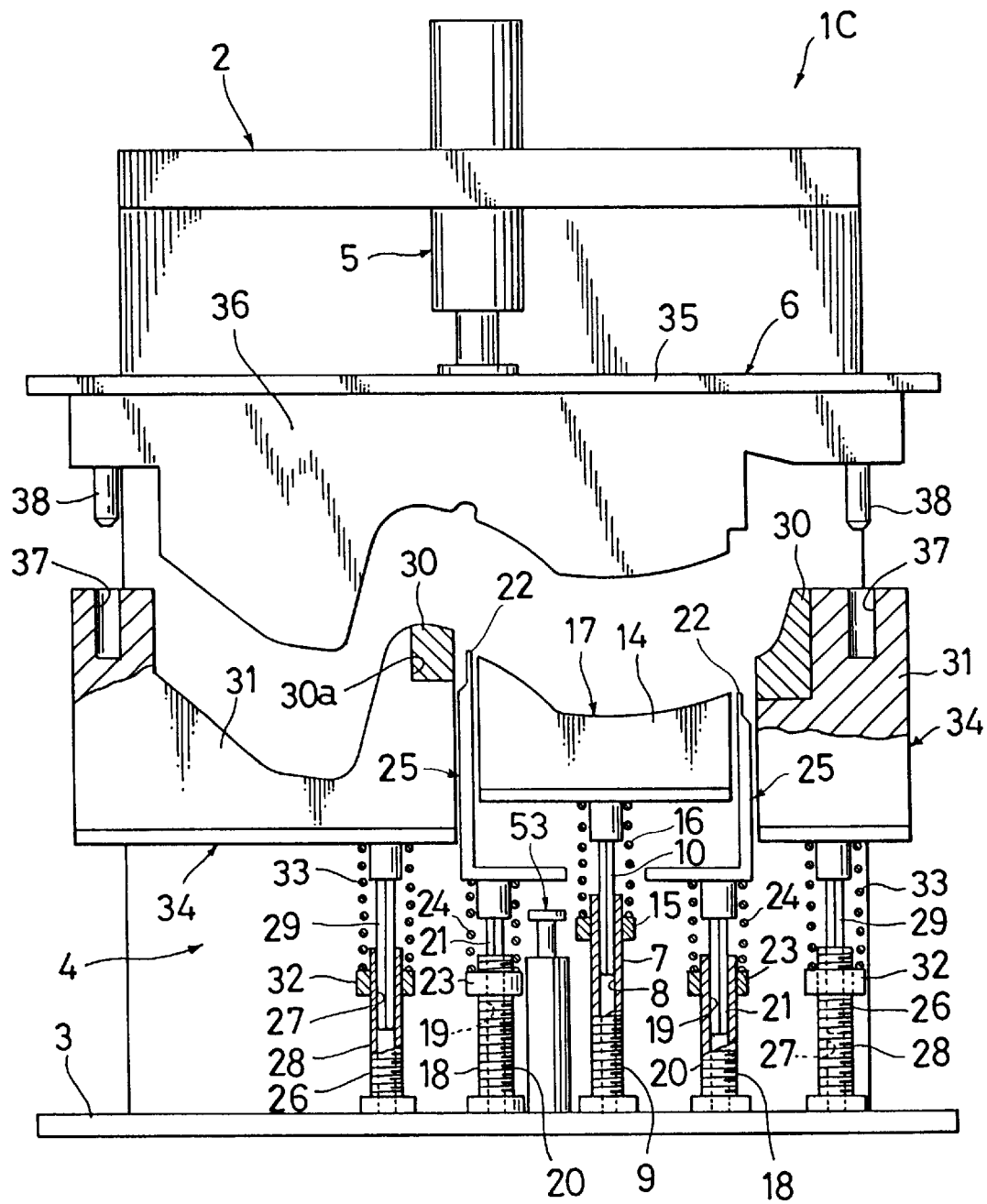
FIG. 17 is a front views partly in cross section, showing the fourth preferred embodiment of the invention.
Figure 18:
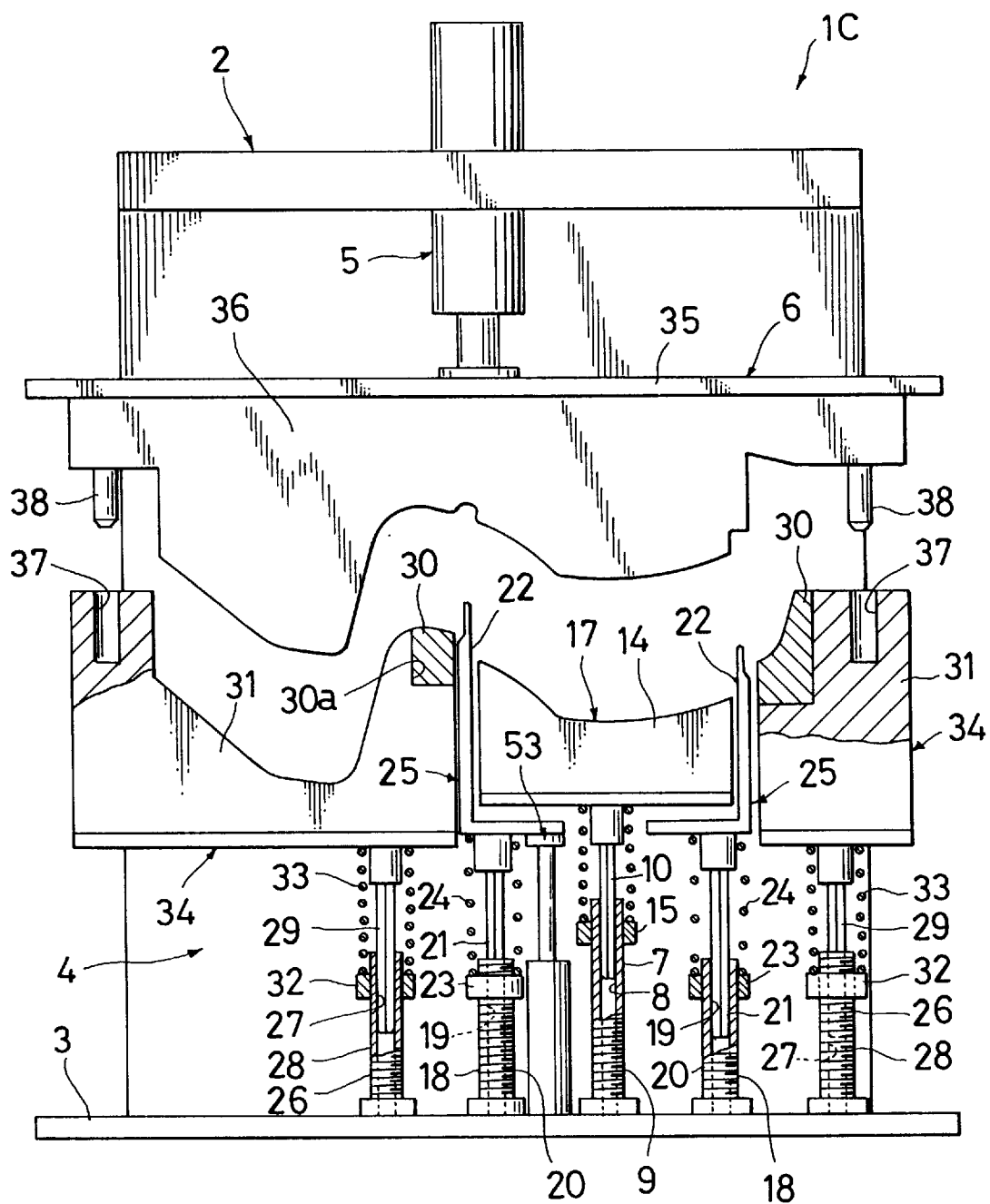
FIG. 18 is an explanatory drawing showing a state where a device for pushing up the tucking blade is operated in the fourth preferred embodiment of the invention.
Figure 19:
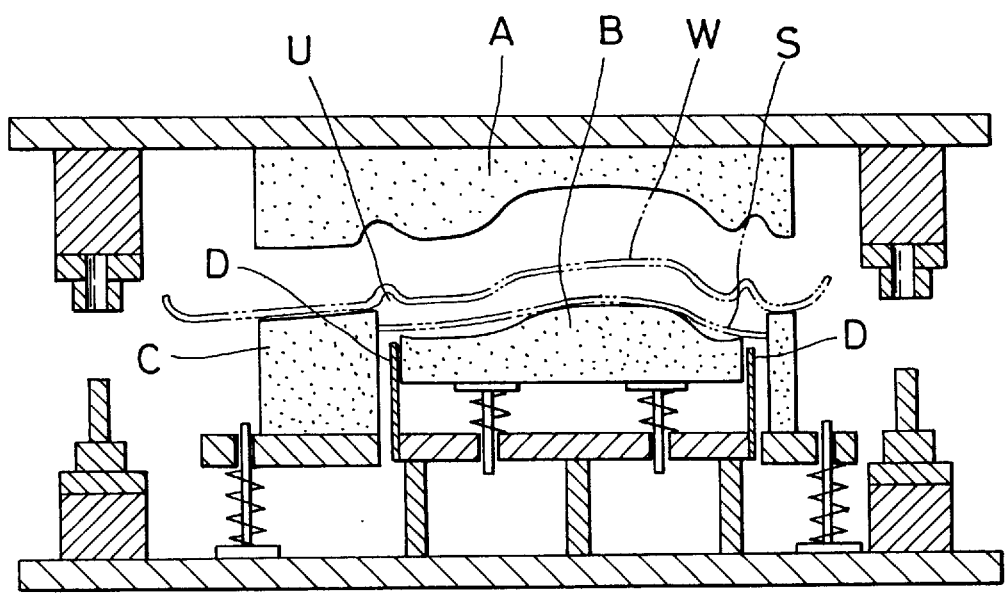
FIG. 19 is an explanatory drawing of the conventional device for tucking covering materials.

In the fourth preferred embodiment of the invention referred to in FIG. 17 to FIG. 19, the major difference points from the first preferred embodiment of the invention is that a tucking blade push-up device 53 is mounted using an air, hydraulic or other cylinder, whereby the tip of the tucking blade 22 can be positioned higher than the upper face of the outer periphery of the support block 41 of the support mold 17 for the formed component when it is cleaned, allowing removal of adhesives etc. stuck on the ring-formed tucking blade 22 of the tucking mold 25. A device 1C for tucking covering materials, including the tucking blade push-up device 53, achieves similar function and advantages as the first preferred embodiment of the invention are and the cleaning of the blade itself of the ring-formed tucking blade 22 is easily done.

In addition, the tucking blade push-up device 53 exhibits a similar function and advantages even if such structure is employed to push down the support molds 17, 17A for the formed component and the support molds 34, 34A for the outer periphery.

In the above respective preferred embodiments of the invention, the explanation of a structure, where the support block, ring-formed tucking blade and support block for outer periphery are supported by one or two support cylinder(s) and support shaft(s), but the scope of this invention is not limited to such embodiment, and includes another embodiment, where the support block, ring-formed tucking blade and support block for outer periphery are supported by plural support cylinders and support shafts. The support shafts can be replaced by round bars.

As is clearly understood from the above descriptions, the following advantages can be obtained from the invention.

(1) The device of the invention comprises a base plate;
    a support mold for formed components having covering materials such as textiles on its upper face and a ring-formed tucking groove outward from the outer periphery of the upper face, which is attached to the base plate and biased by springs so that it may protrude upward all the time;
    a tucking mold including a ring-formed tucking blade which pushes the edge of the outer periphery of the covering materials into the ring-formed tucking groove of the formed component, and which is mounted on the base plate so that an end portion is positioned at the outer periphery of the support mold for formed component, and biased by the springs to be protruding upward all the time;
    a support mold for outer periphery supporting the of the formed component, which is mounted on the said base plate to align with the outer periphery of the ring-formed tucking mold, and biased by the springs in an upward direction all the time; and a pressing mold which moves up aid down by a vertical moving mechanism by means such as a hydraulic cylinder and the like, and which presses the formed component supported by the support mold for outer periphery mid by the support mold for the formed component, whereby any change in displacement distance in a pressing direction of the upper mold is absorbed by the springs, because the support mold for the formed component and the tucking mold and support mold for outer periphery are respectively biased by the springs so that they may protrude upward.

Thus, the traditional disadvantages and troubles, such as the edge of the outer periphery of covering materials, such as textiles, is not pushed into the ring-formed tucking groove due to a change in the amount of displacement in a pressing direction of the upper mold, and/or formed components, and damage to covering materials and ring-formed tucking blades due to being pushed excessively is prevented effectively.

(2) By such structure as explained above since the change in displacement amount is absorbed by the force of the biasing springs and no malfunction occurs, even if the vertical displacement amount of the upper mold should not be set accurately, setting is simple and can be carried out with ease.

(3) By such structure as explained above the springs of the ring-formed tucking blade can absorb displacement from any dust, and/or the wrinkled end of covering materials such as textiles between the ring-formed tucking blade and the groove of formed components, thus any damage of the formed components and of the blade of the ring-formed tucking blade can be prevented securely.

(4) By such structure as described above covering materials such as textiles are capable of being tucked into the formed components effectively.

What is claimed is:

1. A device for tucking covering materials into a formed component having a tucking groove, comprising:

a base plate;

a center support mold for said formed component and means for slidably mounting said center support mold on said base plate to permit travel in a vertical direction;

center support mold bias means for biasing said center support mold in an upward direction away from said base plate;

said center support mold having an upper surface configured to accept said covering materials and said formed component thereon;

said center support mold having an upper surface periphery complementing said formed component such that said tucking groove is disposed outward from and proximate to the upper surface periphery;

a tucking mold having a tucking blade for tucking a peripheral edge of said covering materials into the tucking groove of said formed component;

means for slidably mounting said tucking mold on the said base plate to permit vertical displacement thereof for positioning said tucking blade about and above said upper surface periphery of the center support mold;

tucking mold bias means for biasing said tucking mold along with said tucking blade in an upward direction away from said base plate to raise said tucking blade above said upper surface of said center support mold;

a peripheral support mold for supporting a peripheral edge of said formed component;

means for slidably mounting said peripheral support mold on said base plate to permit vertical travel thereof adjacent an outer periphery of the tucking mold;

peripheral support mold bias means for biasing said peripheral support mold in an upward direction away from said base plate;

a pressing mold for pressing said formed component toward said peripheral support mold; said center support mold, and said tucking mold; and displacement means for supporting and displacing said pressing mold in a downward direction toward said base plate.

2. The device for tucking covering materials of claim 1, wherein at least one of said center support mold bias means, said tucking mold bias means, and said peripheral support mold bias means includes means for variably adjusting bias and height levels thereof.

3. The device for tucking covering materials of claim 1, wherein said tucking blade is affixed to the upper part of the tucking mold and has a detachable blade edge.

4. The device for tucking covering materials of claim 1, wherein a tip of the tucking blade is set to protrude slightly higher than the upper surface at the outer periphery of the center support mold when said pressing mold is at a fully downwardly displaced position.

5. A device for tucking covering materials into a formed component having a tucking groove, comprising:

a base plate;

a center support mold for said formed component and means for slidably mounting said center support mold on said base plate to permit travel in a vertical direction;

center support mold bias means for biasing said center support mold in an upward direction away from said base plate;

said center support mold having an upper surface configured to accept said covering materials and said formed component thereon;

said center support mold having an upper surface periphery complementing said formed component such that said tucking groove is disposed outward from and proximate to the upper surface periphery;

a tucking mold having a tucking blade for tucking a peripheral edge of said covering materials into the tucking groove of said formed component;

means for slidably mounting said tucking mold on the said base plate to permit vertical displacement thereof for positioning said tucking blade about and above said upper surface periphery of the center support mold;

tucking mold bias means for biasing said tucking mold along with said tucking blade in an upward direction away from said base plate to raise said tucking blade above said upper surface of said center support mold;

a peripheral support mold for supporting a peripheral edge of said formed component;

means for slidably mounting said peripheral support mold on said base plate to permit vertical travel thereof adjacent an outer periphery of the tucking mold;

peripheral support mold bias means for biasing said peripheral support mold in an upward direction away from said base plate;

a pressing mold for pressing said formed component toward said peripheral support mold, said center support mold, and said tucking mold;

displacement means for supporting and displacing said pressing mold in a downward direction toward said base plate; and a tucking blade displacement means for displacing the tucking blade of said tucking mold higher than the upper part of the said center support mold to allow access for maintenance.

6. The device for tucking covering materials of claim 5, wherein at least one of said center support mold bias means, said tucking mold bias means, and said peripheral support mold bias means includes means for variably adjusting bias and height levels thereof.

7. The device for tucking covering materials of claim 5, wherein said tucking blade is affixed to the upper part of the tucking mold and has a detachable blade edge.

8. The device for tucking covering materials of claim 5, wherein a tip of the tucking blade is set to protrude slightly higher than the upper surface at the outer periphery of the center support mold when said pressing mold is at a fully downwardly displaced position.

9. The device for tucking covering materials of claim 2, wherein said means for variably adjusting said bias and height levels comprises:

a respective one of said means for slidably mounting including a cylinder vertically mounted on said base, a rod slidably disposed within an interior of said cylinder and said rod supporting a respective mold of said center support mold, said tucking mold, and said peripheral support mold;

said cylinder having a threaded exterior surface and first and second rings having interior threads engaging said threaded exterior surface with said first ring being below said second ring;

said means for biasing of said respective mold being a spring disposed between said second ring and said respective mold;

said cylinder having a longitudinal aperture accessing said interior; and said rod having a dog member extending therefrom and protruding through said longitudinal aperture to engage a lower surface of said first ring whereby rotating adjustment of said first ring limits upward travel of said rod to permit variable adjustment of said height level of said rod and rotating adjustment of said second ring variably compresses said spring to set said bias level.

10. The device for tucking covering materials of claim 5, wherein said means for variably adjusting said bias and height levels comprises:

a respective one of said means for slidably mounting including a cylinder vertically mounted on said base, a rod slidably disposed within an interior of said cylinder and said rod supporting a respective mold of said center support mold, said tucking mold, and said peripheral support mold;

said cylinder having a threaded exterior surface and first and second rings having interior threads engaging said threaded exterior surface with said first ring being below said second ring;

said means for biasing of said respective mold being a spring disposed between said second ring and said respective mold;

said cylinder having a longitudinal aperture accessing said interior; and said rod having a dog member extending therefrom and protruding through said longitudinal aperture to engage a lower surface of said first ring whereby rotating adjustment of said first ring limits upward travel of said rod to permit variable adjustment of said height level of said rod and rotating adjustment of said second ring variably compresses said spring to set said bias level.

* * * * *